US010755077B2

(12) United States Patent
DeBates et al.

(10) Patent No.: US 10,755,077 B2
(45) Date of Patent: Aug. 25, 2020

(54) FINGERPRINT AUTHENTICATION BASED ON FINGERPRINT IMAGER ORIENTATION

(71) Applicant: Motorola Mobility LLC, Chicago, IL (US)

(72) Inventors: Scott Patrick DeBates, Crystal Lake, IL (US); Douglas Alfred Lautner, Round Lake, IL (US); Jagatkumar V. Shah, Lake In The Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 100 days.

(21) Appl. No.: 16/038,876

(22) Filed: Jul. 18, 2018

(65) Prior Publication Data

US 2020/0026896 A1    Jan. 23, 2020

(51) Int. Cl.
| | |
|---|---|
| *G06K 9/00* | (2006.01) |
| *G06F 21/32* | (2013.01) |
| *G06T 7/70* | (2017.01) |
| *G06T 7/33* | (2017.01) |
| *G06F 3/041* | (2006.01) |

(52) U.S. Cl.
CPC ............ *G06K 9/001* (2013.01); *G06F 21/32* (2013.01); *G06K 9/00013* (2013.01); *G06K 9/00067* (2013.01); *G06T 7/337* (2017.01); *G06T 7/70* (2017.01); *G06F 3/041* (2013.01)

(58) Field of Classification Search
CPC .............. G06K 9/001; G06K 9/00013; G06K 9/00067; G06T 7/337; G06T 7/70; G06F 21/32
See application file for complete search history.

(56) References Cited

U.S. PATENT DOCUMENTS

| | | | |
|---|---|---|---|
| 2008/0113685 A1* | 5/2008 | Ishida ................ | G06K 9/00013 455/556.1 |
| 2016/0048165 A1* | 2/2016 | Becze ..................... | G06F 3/044 361/679.27 |
| 2018/0114046 A1* | 4/2018 | Shimada ............... | G06F 3/0485 |

* cited by examiner

*Primary Examiner* — David F Dunphy
(74) *Attorney, Agent, or Firm* — SBMC

(57) ABSTRACT

In aspects of fingerprint authentication based on fingerprint imager orientation, a mobile device has a first housing moveably connected to a second housing in a device configuration that is one of a closed configuration in which the first housing and the second housing are rotated and folded together, or an open configuration in which the first housing and the second housing are rotated apart. The mobile device includes a fingerprint imager to capture a fingerprint image in either device configuration of the mobile device. The mobile device also includes an authentication module to determine an orientation of the fingerprint imager based on the device configuration, manipulate the captured fingerprint image to align with a reference fingerprint image, and authenticate the captured fingerprint image as manipulated to align with the reference fingerprint image for access to the mobile device.

20 Claims, 5 Drawing Sheets

FINGERPRINT AUTHENTICATION BASED ON FINGERPRINT IMAGER ORIENTATION

BACKGROUND

Biosensors are increasingly being used to provide a degree of security for computing devices, such as a mobile phone, tablet device, wearable device, or other types of electronic and/or computing devices. For instance, a computing device may include an authentication module to control access to the computing device by comparing a captured fingerprint image with a stored fingerprint image. Generally, mobile devices are held in a same orientation by a user each time the user presents a fingerprint for authentication, and biosensors anticipate this orientation during authentication. However, devices that are used in multiple device configurations present a problem for biosensor detection orientation and can result in locking out or delaying an authorized user from using his or her device.

BRIEF DESCRIPTION OF THE DRAWINGS

Implementations of fingerprint authentication based on fingerprint imager orientation are described with reference to the following figures. The same numbers may be used throughout to reference like features and components shown in the Figures.

DETAILED DESCRIPTION

Figure 1:
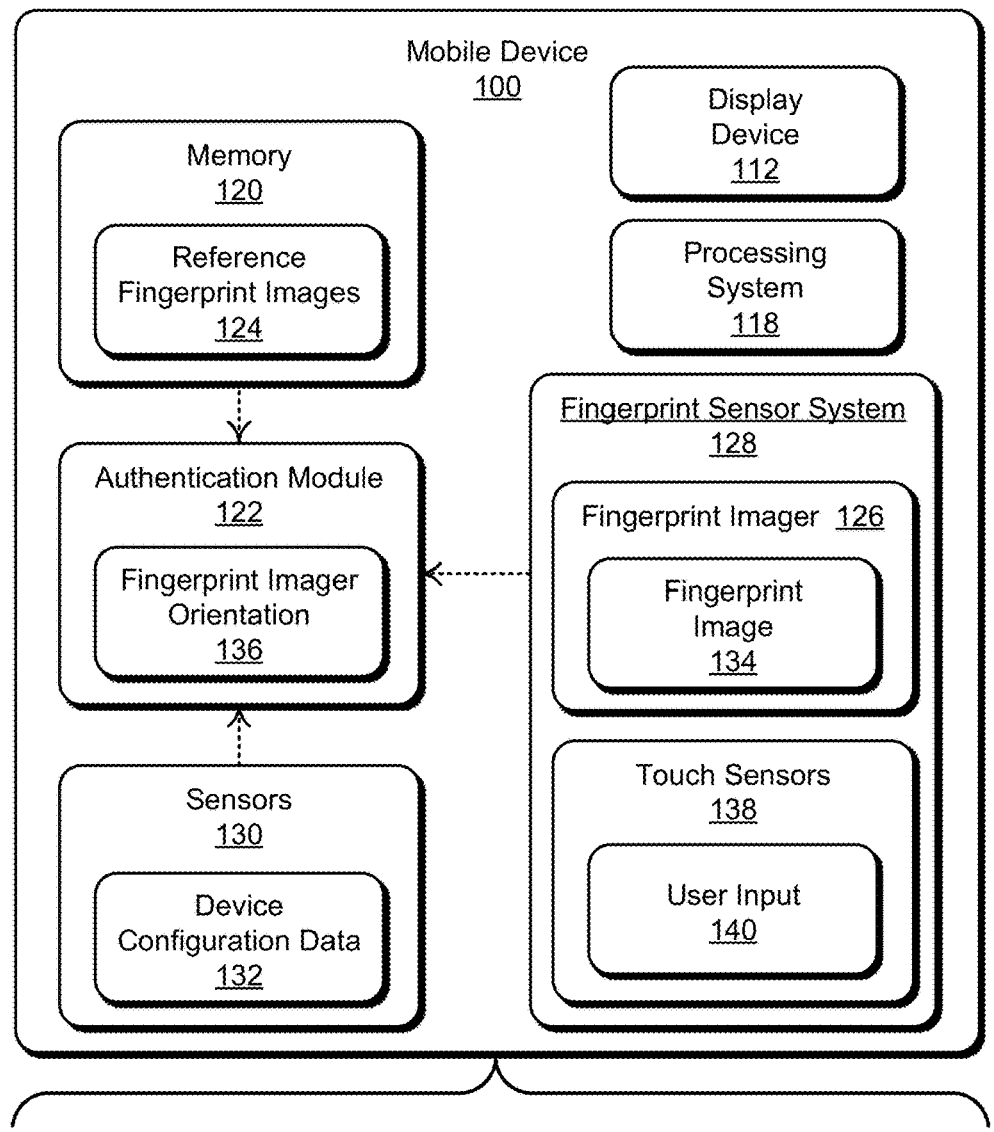
FIG. 1 illustrates an example mobile device in which aspects of fingerprint authentication based on fingerprint imager orientation can be implemented.
Figure 1:
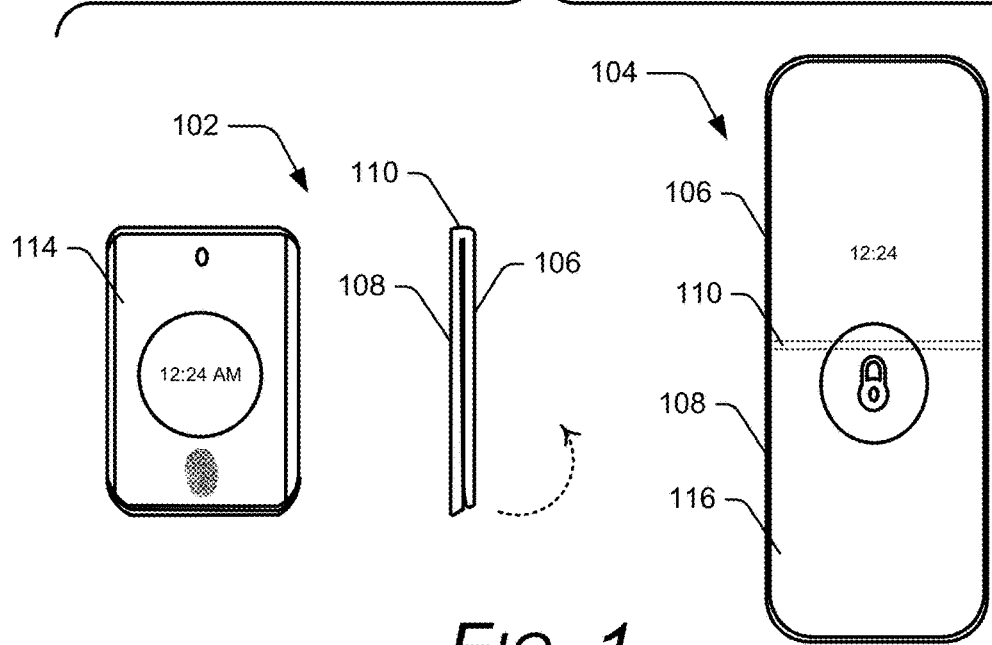

Implementations of fingerprint authentication based on fingerprint imager orientation are described, and techniques allow the use of a biometric sensor in multiple device configurations of a computing device, such as for fingerprint authentication of a mobile phone, tablet device, desktop computer, or other type of computing device. As mobile devices become increasingly ubiquitous, keeping a mobile device both quickly accessible to a user of the device, while also secure from access by others, is increasingly important. Mobile device users expect to quickly and easily unlock their device, such as a mobile phone with fingerprint authentication, while also expecting robust security such that others cannot unlock the device to access their personal data. Accordingly, biometric sensors are increasingly common as a means to secure and provide for authentication access to a computing device.

One example of a biometric sensor is a fingerprint imager, also commonly referred to as a fingerprint sensor. A fingerprint imager captures an image of a fingerprint and the fingerprint image is compared to a stored reference of the fingerprint image. If the captured fingerprint image and the reference fingerprint image are determined to match, the user of the mobile device can be authenticated and the mobile device is unlocked for use by the user of the device. However, if the captured fingerprint image does not match the reference fingerprint image, access to the mobile device is denied, and the device remains locked and secure.

As noted above, mobile devices such as mobile phones and tablet devices that are used in multiple device configurations present a problem for biosensor detection orientation, such as for devices with changeable form factors or devices with variable orientations to the user. As such, a current device configuration or orientation with respect to the user and a biometric sensor needs to be considered when authenticating the user with the biometric sensor. A device with a changeable form factor may be any device that can be used in more than one configuration. For instance, a flip phone, laptop-tablet hybrid, or other type of computing device that can be held by the user in multiple, different configurations and/or orientations. The different configurations and/or orientations may result from a device that has multiple housings, which can be maneuvered or rotated around each other such that the device can be open or closed. In an open configuration, a primary display may be accessible, while in the closed configuration, the primary display may be concealed between the housings, and an exterior display may be accessible.

In aspects of fingerprint authentication based on fingerprint imager orientation, a mobile device can include a fingerprint imager implemented to capture a fingerprint image in different device configurations, such as in a closed configuration or in an open configuration. For example, the mobile device may be designed as a mobile phone or flip phone with a first housing that can be rotated and folded together with a second housing in the closed configuration of the mobile device. Alternatively, the first housing of the device can be rotated apart from the second housing, exposing inner surfaces of the mobile device, such as to expose a primary display device that is integrated in the interior of the housings of the mobile device. The fingerprint imager can be used to initiate authentication of a user and unlocking functionality of the mobile device.

When the mobile device is held by the user in the closed configuration, the fingerprint imager is orientated in such a way as to allow the user placing a finger in position to initiate authentication and unlocking of the device. Alternatively, the user may open the device and hold the device in the open configuration, in which case the fingerprint sensor is in a reverse orientation with respect to the user, having been flipped over and rotated away from the user on the exterior housing while the user holds the device. Generally, the fingerprint sensor is orientated upside down on what is now the back of the device when the user transitions the mobile device from the closed configuration to the open configuration. As a result, the fingerprint imager captures a fingerprint image in the open configuration in a reverse orientation of when the fingerprint image captures the fingerprint image in the closed configuration of the device. Accordingly, in order to accurately compare a captured fingerprint image to a stored reference of the fingerprint image for the user of the device, the captured fingerprint image is manipulated to align with the reference fingerprint image before being compared to the stored reference fingerprint image. The mobile device includes an authentication module that can then authenticate the captured fingerprint image as manipulated to align with the reference fingerprint image, allowing for authentication and access to functionality of the mobile device.

While features and concepts of fingerprint authentication based on fingerprint imager orientation can be implemented in any number of different devices, systems, environments, and/or configurations, aspects of fingerprint authentication based on fingerprint imager orientation are described in the context of the following example devices, systems, and methods.

FIG. 1 illustrates an example mobile device 100 that can be used to implement techniques of fingerprint authentication based on fingerprint imager orientation as described herein. The mobile device 100 may be implemented as a mobile phone, flip phone, tablet device, computing device, camera device, wearable device, or any other type of mobile device that changes form and can assume a variety of device configurations, including a closed configuration 102 and an open configuration 104. Generally, the mobile device 100 may have separate housings, such as a first housing 106 and a second housing 108 that are connected by a hinge, a flex structure, or any other type of housing connector 110 that moveably connects the housings. Alternatively, the housing of the mobile device 100 may be a single housing that is designed to bend or fold, changing the configuration of the mobile device.

The example mobile device 100 also includes a display device 112, which is representative of one or more separate display devices, such as an exterior display 114 that is viewable on an exterior of the housing when the device is in the closed configuration 102, and a primary display 116 that is viewable when the device is in the open configuration 104. The display device 112 may be implemented as a flexible display, such as a flexible OLED screen, and can include a touchscreen or touch-sensitive functionality, such as in one or both of the exterior display 114 and the primary display 116.

In this example, the variety of device configurations refers to different spatial orientations or relationships of the two device housings 106, 108, or parts of the device housings. For example, in the closed configuration 102, the first housing 106 and the second housing 108 are folded together such that the inner surfaces of the mobile device, illustrated as the primary display 116, are concealed, and the exterior display 114 is viewable on the exterior of the housing. In the open configuration 104, the first housing 106 and the second housing 108 are rotated apart to reveal the primary display 116 of the mobile device 100. Generally, the mobile device 100 is any type of an electronic and/or computing device implemented with various components, such as a processing system 118 and a memory 120, as well as any number and combination of different components as further described with reference to the example device shown in FIG. 5. For example, the mobile device 100 can include a power source to power the device.

The mobile device 100 also includes an authentication module 122 that implements aspects of fingerprint authentication based on fingerprint imager orientation as described herein. Generally, the authentication module 122 may include independent processing, memory, and logic components functioning with the mobile device 100. Alternatively or in addition, the authentication module 122 can be implemented as a software application or software module, such as computer-executable software instructions stored in device memory (e.g., the memory 120) and are executable with the processing system 118 of the mobile device 100.

The authentication module 122 can initiate storing reference fingerprint images 124 in the device memory 120 of the mobile device 100. The reference fingerprint images 124 correspond to one or more authorized users of the mobile device, and may include a single fingerprint image of a finger from each user (e.g., a fingerprint image of an index finger), or may include multiple fingerprint images for each user, such as fingerprint images for both a left and a right index finger of a user, or a fingerprint image for each of the user's fingers. The reference fingerprint images 124 are captured by a fingerprint imager 126 of a fingerprint sensor system 128 implemented as a component of the mobile device 100. Notably, the reference fingerprint images 124 are captured in one of the device configurations, such as while the mobile device 100 is orientated in the closed configuration 102 or in the open configuration 104, and a reference fingerprint image is stored in memory in the current orientation of the device when the reference fingerprint image is captured.

In this example, the mobile device 100 includes sensors 130 that generate device configuration data 132 from which the authentication module 122 can determine the current device configuration as the closed configuration 102 or as the open configuration 104. The sensors 130 may be implemented in the mobile device 100 as any one or a combination of sensors, such as a gyroscope, an accelerometer, or motion sensors, such as components of an inertial measurement unit (IMU), as well as infrared (IR) sensors, proximity sensors, a magnetometer, forward or rear facing cameras, or force sensors.

A user of the mobile device 100 can initiate fingerprint authentication using the fingerprint sensor system 128 of the mobile device by touching a finger to the fingerprint imager 126, which captures a fingerprint image 134 of the finger of the user. In implementations, the fingerprint image 134 may be captured as any type of an image, such as an optical image, an ultrasonic image, or a capacitive image. As noted above, the current device configuration and orientation of the fingerprint imager 126 with respect to the user is considered when authenticating the user based on the captured fingerprint image 134, which may be captured at a different orientation than a corresponding reference fingerprint image. If the captured fingerprint image 134 is determined by the authentication module 122 to match the reference fingerprint image 124, then the user of the mobile device can be authenticated and the mobile device is unlocked for use by the user of the device. However, if the captured fingerprint image 134 does not match the reference fingerprint image 124 due to a different device configuration and orientation of the fingerprint imager 126, then access to the mobile device is denied, and the device remains locked and secure.

In aspects of the described fingerprint authentication based on fingerprint imager orientation, the fingerprint imager can capture the fingerprint image 134 in either device configuration of the mobile device 100, and the authentication module 122 can receive sensor data from the device sensors 130 as the device configuration data 132. The authentication module 122 can then determine an orientation of the fingerprint imager 126 based on the sensor data that indicates the device configuration as being in the closed configuration 102 or in the open configuration 104. The authentication module 122 can determine whether to authenticate the user of the mobile device 100 based on the fingerprint image 134 when the mobile device is in either the closed configuration 102 or in the open configuration 104.

In implementations, the authentication module 122 can continually track the fingerprint imager orientation 136 and maintain the current fingerprint imager orientation, such as in the device memory 120, or the authentication module 122 can determine the fingerprint imager orientation 136 responsive to receiving the fingerprint image 134. The authentication module 122 leverages the device configuration data 132 received from the sensors 130 of the mobile device 100 to determine the fingerprint imager orientation 136. The device configuration data 132 that is received from the sensors 130 may be compared to historical or expected values to determine the current configuration of the mobile device 100 as the closed configuration 102 or the open configuration 104.

The authentication module 122 can determine whether to manipulate the captured fingerprint image 134 to align with a reference fingerprint image 124 stored in the memory 120 based on the device configuration and orientation of the fingerprint imager 126 when the fingerprint image 134 is captured. For example, if the mobile device 100 is in the closed configuration 102, the authentication module 122 can compare the captured fingerprint image 134 to the reference fingerprint image 124 for authentication without manipulation of the captured fingerprint image. However, if the mobile device 100 is in the open configuration 104, the authentication module 122 may first flip and/or rotate the captured fingerprint image 134 such that the fingerprint image aligns with an orientation of the reference fingerprint image 124. This may include rotating the fingerprint image 134 one-hundred and eighty degrees (180°), flipping the fingerprint image 134 over both an x-axis and a y-axis of the fingerprint image, or any other manipulation. Notably, the captured fingerprint image 134 may be manipulated if captured by the fingerprint imager 126 in the closed configuration 102 of the mobile device 100, rather than if captured in the open configuration 104. Alternatively or in addition, the authentication module 122 may be implemented to manipulate the reference fingerprint image 124 to correlate and align the orientation with the captured fingerprint image 134.

The authentication module 122 can then compare the manipulated fingerprint image 134 with the reference fingerprint image 124 to authenticate the user to the mobile device 100 based on the captured fingerprint image 134. The authentication module 122 can compare the fingerprint images in a variety of ways, such as by aligning the captured fingerprint image 134 (e.g., manipulated as needed) and the stored reference fingerprint image 124, and comparing patterns of ridges and valleys that appear in the fingerprint images. If a threshold level of similarity between the two fingerprint images is identified by the authentication module 122, then the captured fingerprint image 134 is authenticated, and the mobile device 100 can be unlocked for use by the user. Optionally, the captured fingerprint image 134 (e.g., manipulated as needed) can be compared against multiple stored reference fingerprint images 124, where the different reference fingerprint images correspond to different fingers of an individual user and/or to different users who may each have a user profile on the mobile device 100.

Responsive to authenticating the fingerprint image 134, the authentication module 122 can initiate to unlock functionality of the mobile device 100, both in the closed configuration 102 and in the open configuration 104 of the mobile device. Alternatively, the authentication module 122 may initiate to notify the user that the fingerprint image 134 was not authenticated, such as a notification in the form of text displayed, presentation of a keypad or keyboard to enter a password, an animation, haptic feedback, or continued presentation of the lock screen. The functionality of the mobile device 100 that is unlocked responsive to authentication of the user based on the captured fingerprint image 134 can include enabling the fingerprint sensor system 128 as an input device. For example, the fingerprint sensor system 128 can include one or more touch sensors 138 that can be used to determine when to capture the fingerprint image 134 with the fingerprint imager 126. The touch sensors 138 may also be enabled to receive a user input 140 in the form of swipe gestures, clicks, touch contacts, and so on, where the user input 140 can then be interpreted based on the device configuration.

Figure 2:
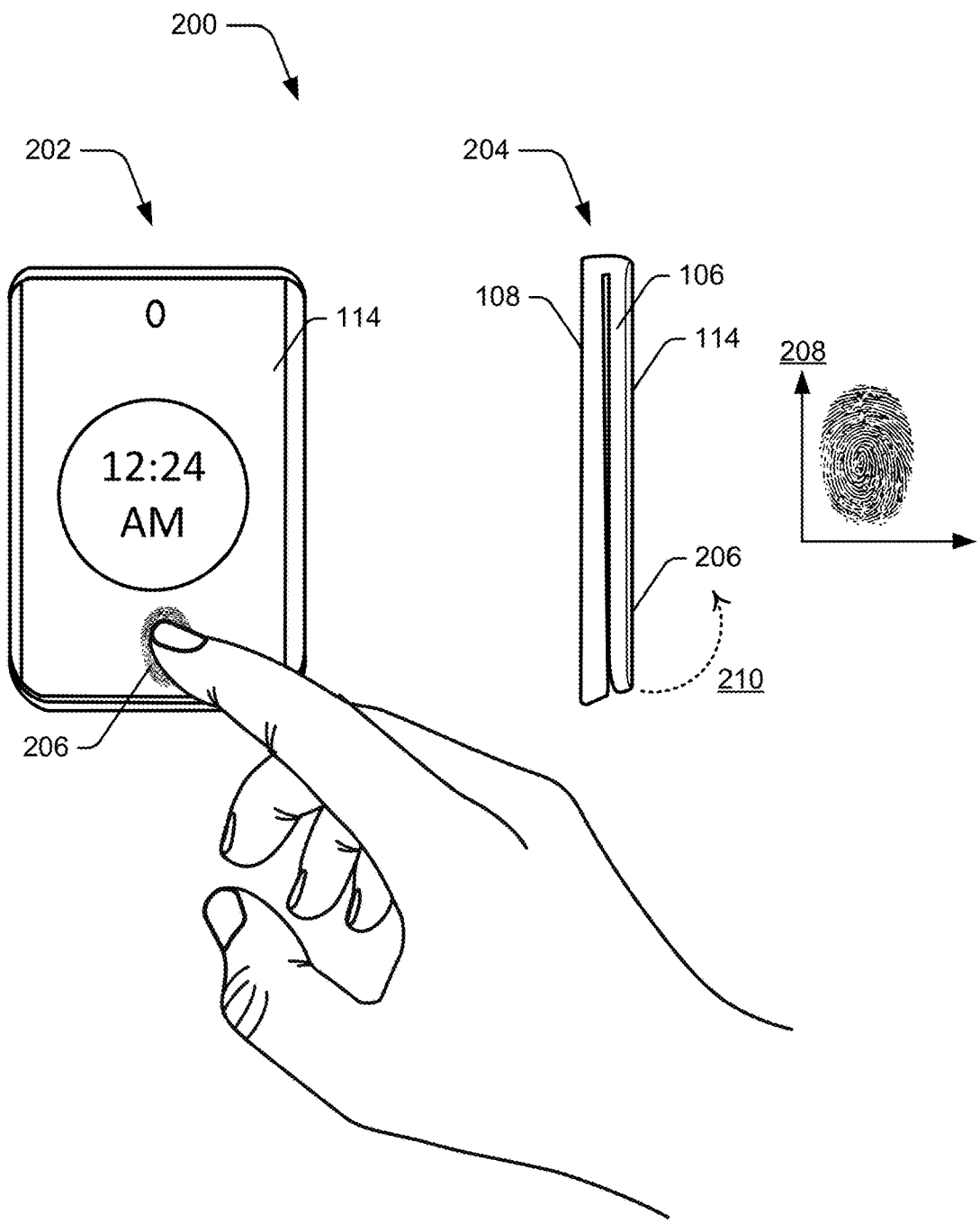
FIG. 2 illustrates an example configuration of the mobile device in which aspects of fingerprint authentication based on fingerprint imager orientation can be implemented.

FIG. 2 illustrates an example configuration 200 of the mobile device 100 that is shown and described with reference to FIG. 1, and in which aspects of fingerprint authentication based on fingerprint imager orientation can be implemented. A use case 202 and a side view 204 of the closed configuration 102 of the mobile device 100 are each illustrated in this example. In the closed configuration 102, the exterior display 114 may display a clock, notifications, application user interfaces, and so on. Access to functionality of the exterior display 114 may require authentication for some or all of the functionality. A user of the mobile device 100 can initiate authentication by placing a finger on the fingerprint imager 126 of the fingerprint sensor system 128 at the illustrated fingerprint location 206 on the exterior display 114. As shown in the side view 204, the fingerprint location 206 is associated with a set of axes 208 that define an orientation of the fingerprint imager 126 of the fingerprint sensor system 128.

As described above, the mobile device 100 in this example has a first housing 106 and a second housing 108 connected by the housing connector 110, which may be any sort of a hinge or flex structure that moveably connects the device housings. An arrow 210 shows a direction of movement of the first housing 106 when the mobile device 100 is changed from the closed configuration 102 to the open configuration 104. Notably, as the change in device configuration occurs, the orientation of the fingerprint sensor system 128 changes with respect to the mobile device, and when the user places a finger on the fingerprint imager 126 in the open configuration 104 of the device, the alignment and orientation of the user fingerprint with the fingerprint imager 126 is changed.

Figure 3:
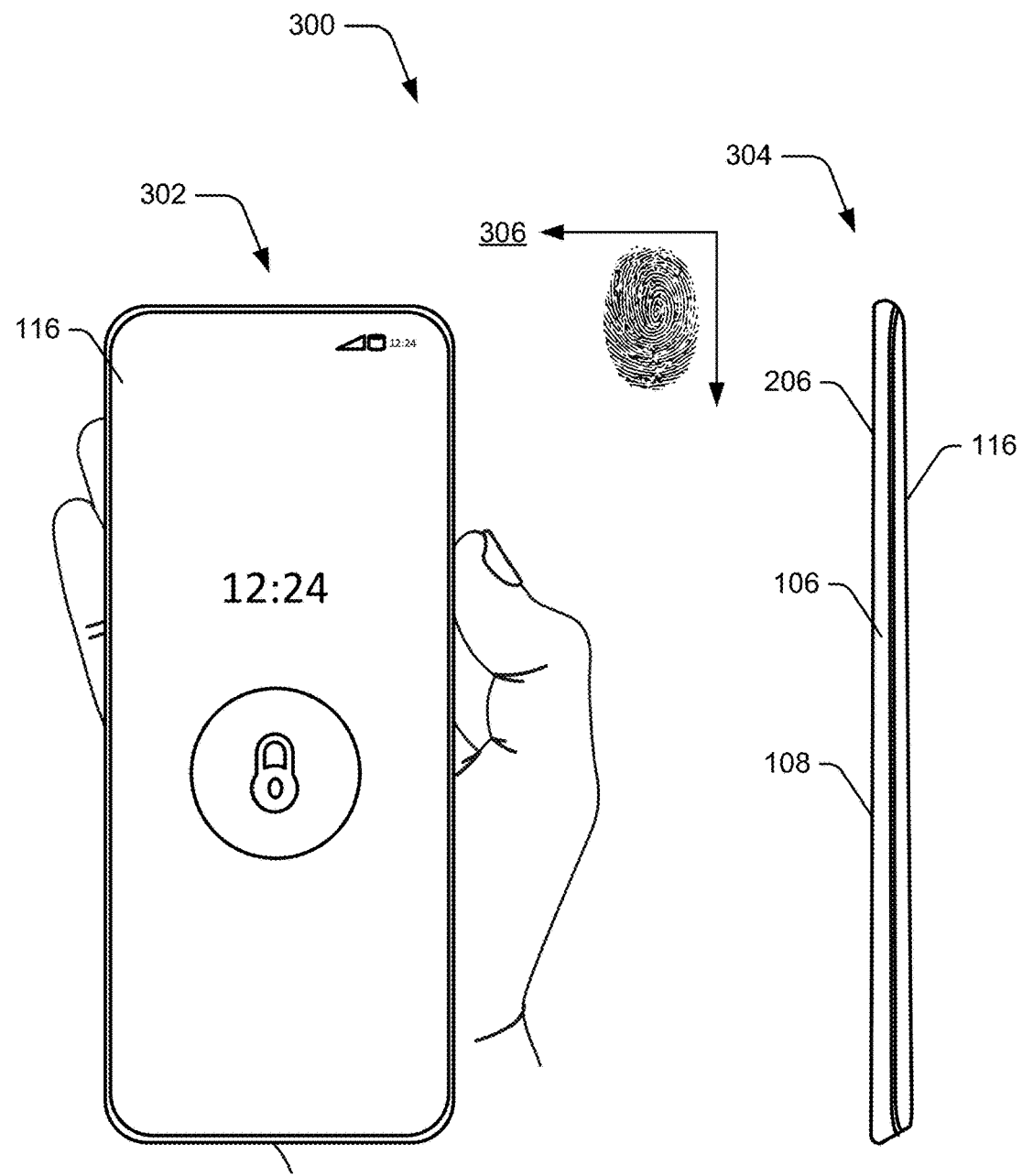
FIG. 3 illustrates another example configuration of the mobile device in which aspects of fingerprint authentication based on fingerprint imager orientation can be implemented.

FIG. 3 illustrates another example configuration 300 of the mobile device 100 that is shown and described with reference to FIG. 1, and in which aspects of fingerprint authentication based on fingerprint imager orientation can be implemented. A use case 302 and a side view 304 of the open configuration 104 of the mobile device 100 are each illustrated in this example. In the open configuration 104, the primary display 116 is revealed as the inner surfaces of the mobile device. Typically, when the user holds the mobile device 100 in the open configuration 104, it is with the primary display 116 facing towards the user, as shown in this example. As such, the exterior display 114 and the fingerprint sensor system 128 face away from the user, although the functionality on both the exterior display 114 and the primary display 116 can be accessible and used simultaneously. As shown in the use case 302, the user may hold the mobile device 100 with their fingers resting along the back of the device where the fingerprint sensor system 128 is disposed. This enables the user to initiate authentication by way of a fingerprint while holding the mobile device 100 in the natural position. Further, the user is able to be authenticated by the authentication module 122 of the mobile device 100 with a single hand, rather than requiring the user hold the mobile device 100 with one hand and initiate a fingerprint on the fingerprint imager 126 with the other.

In the side view 304 of the open configuration 104 of the mobile device 100, the fingerprint sensor system 128 is illustrated with an accompanying set of axes 306 conveying the orientation of the fingerprint imager 126 of the fingerprint sensor system 128 in the device configuration. When the mobile device 100 is changed from the closed configuration 102 to the open configuration 104, the fingerprint sensor system 128 (e.g., the fingerprint imager 126) is rotated one-hundred and eighty degrees (180°) in relation to the user, and when the user places a finger on the fingerprint imager 126 in the open configuration 104 of the device, the orientation and alignment of the user's finger does not align with the top of the fingerprint imager 126 as it did in the closed configuration 102. As described above, the authentication module 122 can determine the orientation of the fingerprint imager 126 based on the device configuration, and the authentication module 122 can then manipulate the captured fingerprint image 134 in the open configuration 104 and quickly and accurately authenticate the user.

Example method 400 is described with reference to FIG. 4 in accordance with implementations of fingerprint authentication based on fingerprint imager orientation. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
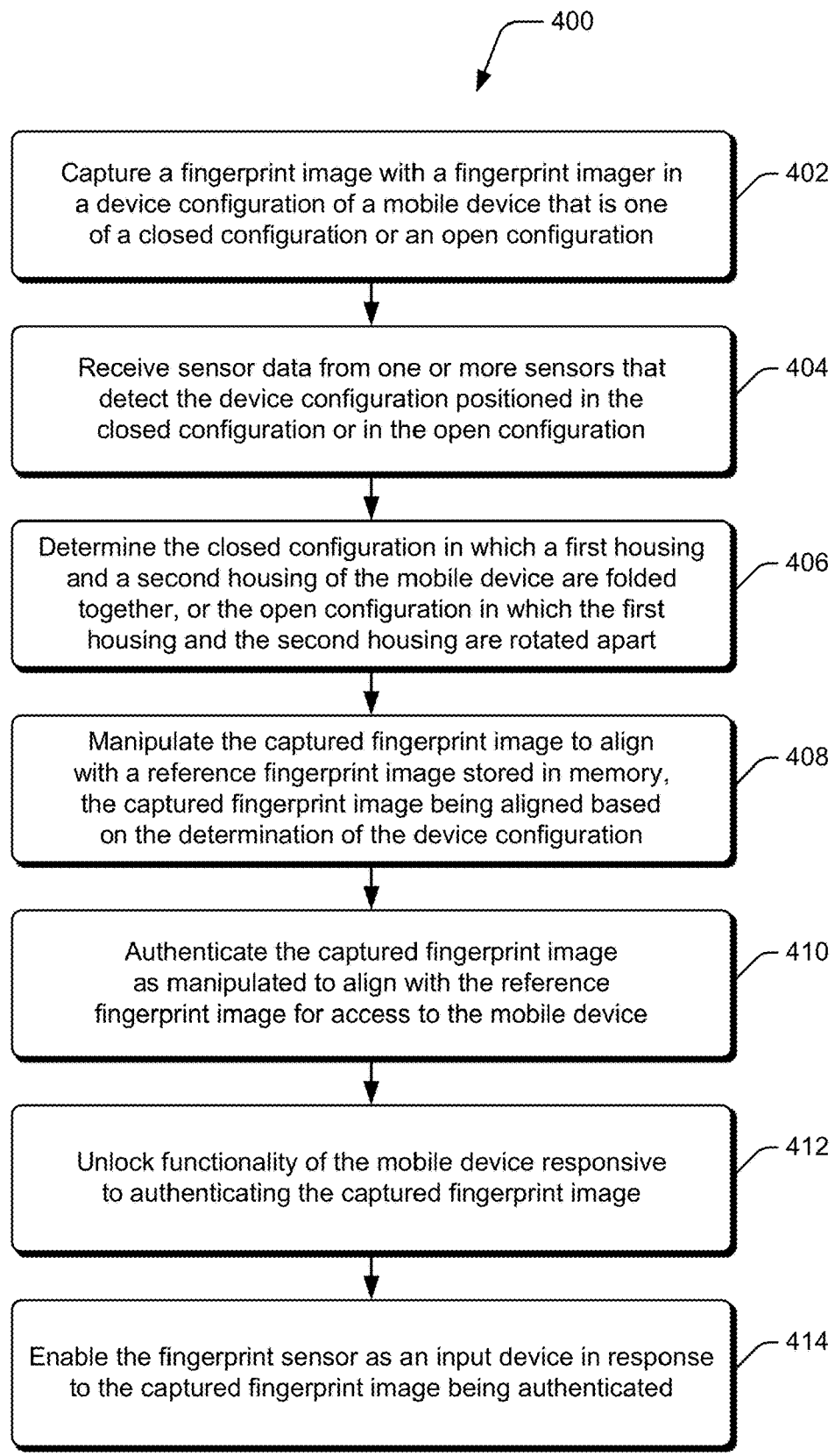
FIG. 4 is an example method of fingerprint authentication based on fingerprint imager orientation in accordance with one or more implementations of the techniques described herein.

FIG. 4 illustrates example method(s) 400 of fingerprint authentication based on fingerprint imager orientation as described herein, and is generally described with reference to an authentication module implemented in a mobile device. The order in which the method is described is not intended to be construed as a limitation, and any number or combination of the described method operations can be performed in any order to perform a method, or an alternate method.

At 402, a fingerprint image is captured with a fingerprint imager in a device configuration of a mobile device that is one of a closed configuration or an open configuration. For example, the fingerprint imager 126 of the fingerprint sensor system 128 captures the fingerprint image 134, which may be captured as any type of an image, such as an optical image, an ultrasonic image, a capacitive image, or any other type of fingerprint image.

At 404, sensor data is received from one or more sensors that detect the device configuration positioned in the closed configuration or in the open configuration. For example, the authentication module 122 that is implemented by the mobile device 100 receives the device configuration data 132 from the device sensors 130. The sensors 130 may be implemented in the mobile device 100 as any one or a combination of sensors, such as a gyroscope, an accelerometer, or motion sensors, such as components of an inertial measurement unit (IMU), as well as infrared (IR) sensors, proximity sensors, a magnetometer, forward or rear facing cameras, or force sensors. Notably, the sensor data (e.g., the device configuration data) can be received from the sensors 130 responsive to a request from the authentication module 122, or the sensor data can be communicated to the authentication module 122 periodically, such as once a second, or when a change in device configuration is detected.

At 406, the device configuration is determined as the closed configuration in which a first housing and a second housing of the mobile device are folded together, or as the open configuration in which the first housing and the second housing are rotated apart. For example, the authentication module 122 determines, based at least in part on the sensor data, the closed configuration 102 in which the first housing 106 and the second housing 108 of the mobile device 100 are folded together, and thus the fingerprint imager orientation 136 is determined as being upright with respect to the exterior display 114. If the device configuration is determined to be the open configuration 104 in which the first housing 106 and the second housing 108 are rotated apart, exposing inner surfaces of the mobile device, then the fingerprint imager orientation 136 is determined as being upside down with respect to the primary display 116. The inner surfaces of the mobile device 100 are the primary display 116. Alternatively, the inner surfaces of the mobile device may include some combination of a display device, input devices, sensors, or other device features.

At 408, the captured fingerprint image is manipulated to align with a reference fingerprint image stored in memory, the captured fingerprint image being aligned based on the determination of the device configuration. For example, the authentication module 122 manipulates the captured fingerprint image 134 to align with the reference fingerprint image 124 stored in the memory 120, where the fingerprint images are aligned based on the determination of the device configuration. In implementations, the authentication module 122 manipulates the captured fingerprint image 134 by rotating the fingerprint image one-hundred and eighty degrees (180°) to align with the reference fingerprint image 124. The authentication module 122 can also manipulate the captured fingerprint image 134 by flipping the fingerprint image across both an x-axis and a y-axis of the fingerprint image. Alternatively or in addition, the authentication module 122 can manipulate the reference fingerprint image 124 to correlate and align the orientation with the captured fingerprint image 134 based on the orientation of the fingerprint imager 126.

At 410, the captured fingerprint image, as manipulated to align with the reference fingerprint image, is authenticated for access to the mobile device. For example, the authentication module 122 compares the manipulated fingerprint image 134 with the reference fingerprint image 124 to authenticate the user to the mobile device 100 based on the captured fingerprint image 134. The authentication module 122 can compare the fingerprint images in a variety of ways, such as by aligning the captured fingerprint image 134 (e.g., manipulated as needed at 408) and the stored reference fingerprint image 124, and comparing patterns of ridges and valleys that appear in the fingerprint images. If a threshold level of similarity between the two fingerprint images is identified by the authentication module 122, then the captured fingerprint image 134 is authenticated, and the mobile device 100 can be unlocked for use by the user. Optionally, the captured fingerprint image 134 (e.g., manipulated as needed at 408) can be compared against multiple stored reference fingerprint images 124, where the different reference fingerprint images correspond to different fingers of an individual user and/or to different users who may each have a user profile on the mobile device 100.

At 412, functionality of the mobile device is unlocked responsive to authenticating the captured fingerprint image.

For example, the authentication module 122 unlocks the functionality of the mobile device 100 responsive to authenticating the captured fingerprint image 134, and the functionality of the mobile device is accessible via one or both of the primary display 116 and the exterior display 114. Alternatively, the authentication module 122 may initiate to notify the user that the fingerprint image 134 does not match the reference fingerprint image 124 and the user is not authenticated to use the mobile device. This notification may be communicated as text displayed, presentation of a keypad or keyboard to enter a password, as an animation, haptic feedback, or continued presentation of the lock screen.

At 414, the fingerprint sensor is enabled as an input device in response to the captured fingerprint image being authenticated. For example, the fingerprint sensor system 128 includes the touch sensors 138 that can be enabled to receive a user input 140 in the form of swipe gestures, clicks, touch contacts, and so on, where the user input 140 can then be interpreted based on the device configuration. In the open configuration 104 of the mobile device 100, the fingerprint sensor system 128 is on the opposite side of the device from the primary display 116, which affects how a direction of a swipe input would be recognized. For instance, a swipe input from right-to-left on the fingerprint sensor system 128 when the mobile device 100 is in the closed configuration 102, and a swipe input from right-to-left when the mobile device is in the open configuration 104 occur in opposite directions relative to the fingerprint sensor system. As such, the current device configuration can establish the use of the fingerprint sensor system 128 as an input device, such that user inputs via the fingerprint sensor system 128 are determined by the authentication module 122 relative based on the current device configuration.

Figure 5:
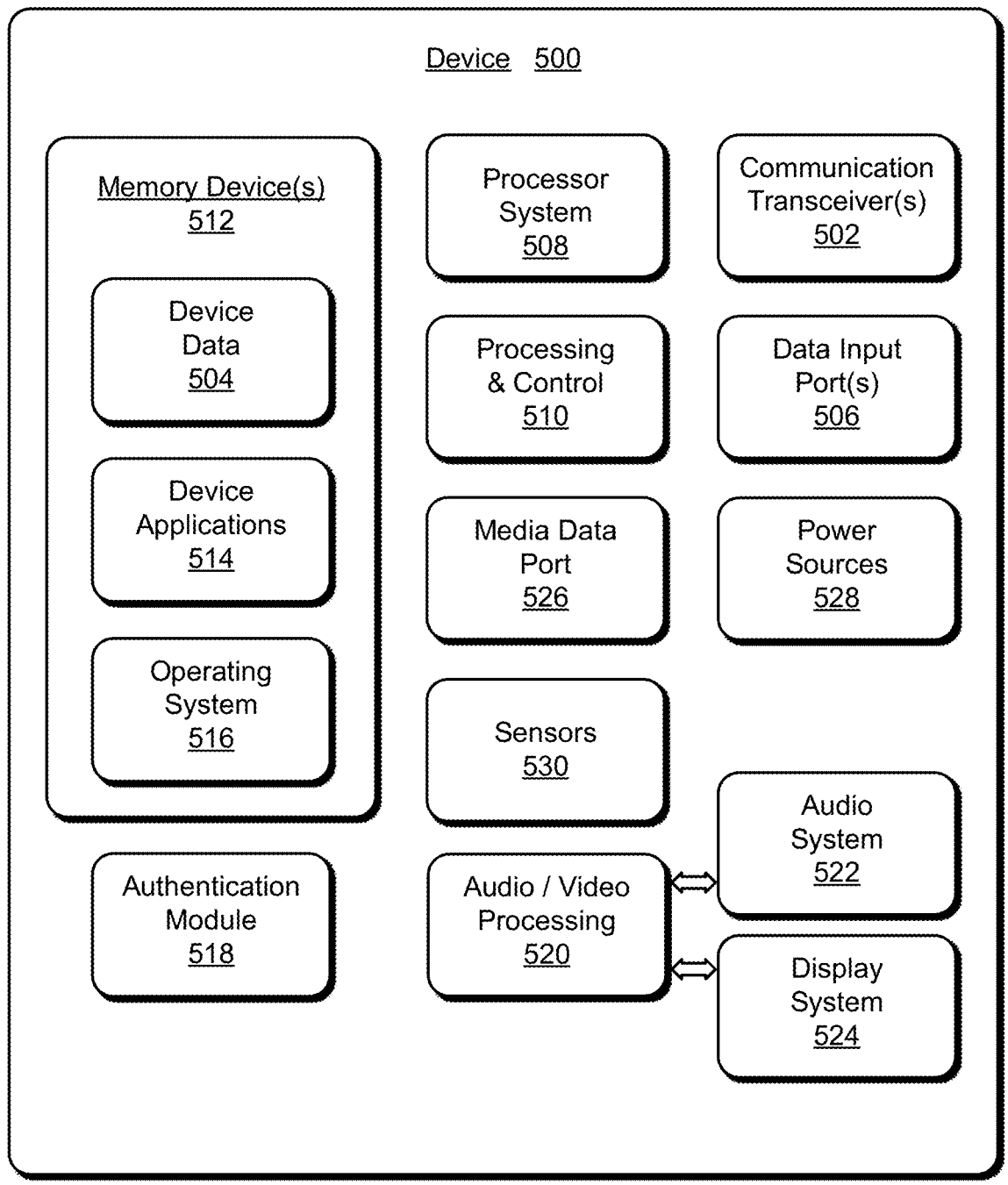
FIG. 5 illustrates an example device that can implement aspects of fingerprint authentication based on fingerprint imager orientation.

FIG. 5 illustrates various components of an example device 500 in which embodiments of fingerprint authentication based on fingerprint imager orientation can be implemented. The example device 500 can be implemented as any of the mobile devices described with reference to FIGS. 1-4, such as any type of client device, mobile phone, tablet, computing device, communication, entertainment, gaming, media playback, and/or other type of device. For example, the mobile device 100 shown and described with reference to FIGS. 1-4 may be implemented as the example device 500.

The device 500 includes communication transceivers 502 that enable wired and/or wireless communication of device data 504 with other devices. The device data 504 can include any of the reference fingerprint images, the captured and manipulated fingerprint images, the fingerprint imager orientation, the device configuration data, and any other fingerprint authentication data. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processor system 508 of one or more processors (e.g., any of microprocessors, controllers, and the like) and/or a processor and memory system implemented as a system-on-chip (SoC) that processes computer-executable instructions. The processor system 508 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device 500 can be implemented with any one or combination of software, hardware, firmware, or fixed logic circuitry that is implemented in connection with processing and control circuits, which are generally identified at 510. The device 500 may further include any type of a system bus or other data and a command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the memory 512 include volatile memory and non-volatile memory, fixed and removable media devices, and any suitable memory device or electronic data storage that maintains data for computing device access. The memory devices can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processor system 508. The device applications may also include a device manager, such as any form of a control application, software application, signal-processing and control module, code that is native to a particular device, a hardware abstraction layer for a particular device, and so on. In this example, the device 500 includes an authentication module 518 that implements embodiments of fingerprint authentication based on fingerprint imager orientation, and may be implemented with hardware components and/or in software as one of the device applications 514, such as when the device 500 is implemented as the mobile device 100 described with reference to FIGS. 1-4. An example of the authentication module 518 is the authentication module 122 that is implemented as a software application and/or as hardware components in the mobile device 100. In implementations, the authentication module 518 may include independent processing, memory, and logic components as a computing and/or electronic device integrated with the device 500.

The device 500 also includes an audio and/or video processing system 520 that generates audio data for an audio system 522 and/or generates display data for a display system 524. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 526. In implementations, the audio system and/or the display system are integrated components of the example device. Alternatively, the audio system and/or the display system are external, peripheral components to the example device.

The device 500 can also include one or more power sources 528, such as when the device is implemented as a mobile device. The power sources may include a charging and/or power system, and can be implemented as a flexible strip battery, a rechargeable battery, a charged super-capacitor, and/or any other type of active or passive power source. The device 500 also includes sensors 530, such as may be implemented in an inertial measurement unit (IMU). The sensors 530 can be implemented with various sensors, such as a gyroscope, an accelerometer, and/or other types of motion sensors to sense motion of the device. The various sensors 530 may also be implemented as infrared (IR) sensors, proximity sensors, a magnetometer, forward or rear facing cameras, force sensors, or as any other type of device sensors.

Although implementations of fingerprint authentication based on fingerprint imager orientation have been described in language specific to features and/or methods, the subject of the appended claims is not necessarily limited to the specific features or methods described. Rather, the specific features and methods are disclosed as example implementations of fingerprint authentication based on fingerprint imager orientation, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising: a first housing moveably connected to a second housing in a device configuration that is one of a closed configuration in which the first housing and the second housing are rotated and folded together, or an open configuration in which the first housing and the second housing are rotated apart exposing inner surfaces of the mobile device; a fingerprint imager to capture a fingerprint image in either device configuration of the mobile device; an authentication module to: receive an indication of the device configuration positioned in the closed configuration or in the open configuration; determine an orientation of the fingerprint imager based on the indication of the device configuration; manipulate the captured fingerprint image to align with a reference fingerprint image stored in memory, the captured fingerprint image being aligned based on the determination of the orientation of the fingerprint imager; and authenticate the captured fingerprint image as manipulated to align with the reference fingerprint image for access to the mobile device.

Alternatively or in addition to the above described mobile device, any one or combination of: the inner surfaces of the mobile device are concealed in the closed configuration in which the first housing and the second housing are folded together. The authentication module is configured to manipulate the captured fingerprint image by rotating the captured fingerprint image one-hundred and eighty degrees (180°) to align with the reference fingerprint image. The authentication module is configured to manipulate the captured fingerprint image by flipping the captured fingerprint image across an x-axis and across a y-axis of the captured fingerprint image. The mobile device further comprising one or more sensors configured to detect the device configuration positioned in the closed configuration or in the open configuration; and wherein the authentication module is configured to receive the indication of the device configuration as sensor data from the one or more sensors. The authentication module is configured to unlock the mobile device responsive to the captured fingerprint image being authenticated. The authentication module is configured to unlock functionality of the mobile device in both the closed configuration and the open configuration responsive to the captured fingerprint image being authenticated. The fingerprint authentication module is configured to enable the fingerprint imager as an input device responsive to the captured fingerprint image being authenticated.

A method, comprising: capturing a fingerprint image with a fingerprint imager in a device configuration of a mobile device that is one of a closed configuration or an open configuration; determining the closed configuration in which a first housing and a second housing of the mobile device are folded together, or the open configuration in which the first housing and the second housing are rotated apart exposing inner surfaces of the mobile device; manipulating the captured fingerprint image to align with a reference fingerprint image stored in memory, the captured fingerprint image being aligned based on the determination of the device configuration; and authenticating the captured fingerprint image as manipulated to align with the reference fingerprint image for access to the mobile device.

Alternatively or in addition to the above described method, any one or combination of: receiving sensor data from one or more sensors that detect the device configuration positioned in the closed configuration or in the open configuration; and wherein the determining the device configuration is based at least in part on the sensor data. The manipulating comprises rotating the captured fingerprint image one-hundred and eighty degrees (180°) to align with the reference fingerprint image. The method further comprising unlocking functionality of the mobile device responsive to the authenticating. The method further comprising: enabling the fingerprint imager as an input device responsive to the captured fingerprint image being authenticated; receiving an input via the fingerprint imager; and interpreting the input based on the device configuration. The inner surfaces of the mobile device each comprises a display device.

A fingerprint sensor system, comprising: a fingerprint imager to capture a fingerprint image; an authentication module to: determine an orientation of the captured fingerprint image relative to the fingerprint imager; manipulate the captured fingerprint image to align with a reference fingerprint image stored in memory, the captured fingerprint image being aligned based on the relative orientation to the fingerprint imager; and authenticate the captured fingerprint image as manipulated to align with the reference fingerprint image.

Alternatively or in addition to the above described fingerprint sensor system, any one or combination of: the authentication module is configured to manipulate the captured fingerprint image by flipping the captured fingerprint image across an x-axis and across a y-axis of the captured fingerprint image. The authentication module is configured to manipulate the captured fingerprint image by rotating the captured fingerprint image one-hundred and eighty degrees (180°) to align with the reference fingerprint image. The fingerprint sensor system is implemented in a mobile device, wherein the authentication module is configured to unlock the mobile device responsive to the captured fingerprint image being authenticated. The fingerprint imager is enabled to receive an input responsive to the captured fingerprint image being authenticated, and the authentication module is implemented to interpret the input based on the device configuration. The authentication module is configured to unlock functionality of the mobile device in both the closed configuration and the open configuration responsive to the captured fingerprint image being authenticated.

The invention claimed is:

1. A mobile device, comprising:
 a first housing moveably connected to a second housing in a device configuration that is one of a closed configuration in which the first housing and the second housing are rotated and folded together, or an open configuration in which the first housing and the second housing are rotated apart exposing inner surfaces of the mobile device;
 a fingerprint imager to capture a fingerprint image in either device configuration of the mobile device;
 an authentication module implemented at least partially in hardware to:
  receive an indication of the device configuration positioned in the closed configuration or in the open configuration;
  determine an orientation of the fingerprint imager based on the indication of the device configuration;
  manipulate the captured fingerprint image to align with a reference fingerprint image stored in memory, the captured fingerprint image being aligned based on the determination of the orientation of the fingerprint imager;
  authenticate the captured fingerprint image as manipulated to align with the reference fingerprint image for access to the mobile device;
  receive an input via the fingerprint imager enabled as an input device; and
  interpret the input based on the device configuration.

2. The mobile device of claim 1, wherein the inner surfaces of the mobile device are concealed in the closed configuration in which the first housing and the second housing are folded together.

3. The mobile device of claim 1, wherein the authentication module is configured to manipulate the captured fingerprint image by rotating the captured fingerprint image one-hundred and eighty degrees (180°) to align with the reference fingerprint image.

4. The mobile device of claim 1, wherein the authentication module is configured to manipulate the captured fingerprint image by flipping the captured fingerprint image across an x-axis and across a y-axis of the captured fingerprint image.

5. The mobile device of claim 1, further comprising:
 one or more sensors configured to detect the device configuration positioned in the closed configuration or in the open configuration; and
 wherein the authentication module is configured to receive the indication of the device configuration as sensor data from the one or more sensors.

6. The mobile device of claim 5, wherein the authentication module is configured to unlock the mobile device responsive to the captured fingerprint image being authenticated.

7. The mobile device of claim 1, wherein the authentication module is configured to unlock functionality of the mobile device in both the closed configuration and the open configuration responsive to the captured fingerprint image being authenticated.

8. The mobile device of claim 1, wherein the authentication module is configured to enable the fingerprint imager as the input device responsive to the captured fingerprint image being authenticated.

9. A method, comprising:
 capturing a fingerprint image with a fingerprint imager in a device configuration of a mobile device that is one of a closed configuration or an open configuration;
 determining the closed configuration in which a first housing and a second housing of the mobile device are folded together, or the open configuration in which the first housing and the second housing are rotated apart exposing inner surfaces of the mobile device;
 manipulating the captured fingerprint image to align with a reference fingerprint image stored in memory, the captured fingerprint image being aligned based on the determination of the device configuration;
 authenticating the captured fingerprint image as manipulated to align with the reference fingerprint image for access to the mobile device;
 receiving an input via the fingerprint imager enabled as an input device; and
 interpreting the input based on the device configuration.

10. The method of claim 9, further comprising:
 receiving sensor data from one or more sensors that detect the device configuration positioned in the closed configuration or in the open configuration; and
 wherein the determining the device configuration is based at least in part on the sensor data.

11. The method of claim 9, wherein the manipulating comprises rotating the captured fingerprint image one-hundred and eighty degrees (180°) to align with the reference fingerprint image.

12. The method of claim 9, further comprising unlocking functionality of the mobile device responsive to the authenticating.

13. The method of claim 9, further comprising:
 enabling the fingerprint imager as the input device responsive to the captured fingerprint image being authenticated.

14. The method of claim 9, wherein the inner surfaces of the mobile device each comprises a display device.

15. A fingerprint sensor system, comprising:
 a fingerprint imager to capture a fingerprint image;
 an authentication module implemented at least partially in hardware to:
  determine an orientation of the captured fingerprint image relative to the fingerprint imager;
  manipulate the captured fingerprint image to align with a reference fingerprint image stored in memory, the captured fingerprint image being aligned based on the relative orientation to the fingerprint imager;
  authenticate the captured fingerprint image as manipulated to align with the reference fingerprint image;
  receive an input via the fingerprint imager enabled as an input device; and interpret the input based on an open configuration or a closed configuration of a mobile device that includes the fingerprint sensor system.

16. The fingerprint sensor system of claim 15, wherein the authentication module is configured to manipulate the captured fingerprint image by flipping the captured fingerprint image across an x-axis and across a y-axis of the captured fingerprint image.

17. The fingerprint sensor system of claim 15, wherein the authentication module is configured to manipulate the captured fingerprint image by rotating the captured fingerprint image one-hundred and eighty degrees (180°) to align with the reference fingerprint image.

18. The fingerprint sensor system of claim 15 implemented in a mobile device, wherein the authentication module is configured to unlock the mobile device responsive to the captured fingerprint image being authenticated.

19. The fingerprint sensor system of claim 15, wherein the fingerprint imager is enabled to receive the input responsive to the captured fingerprint image being authenticated.

20. The fingerprint sensor system of claim 15, wherein the authentication module is configured to unlock functionality of the mobile device in both the closed configuration and the open configuration responsive to the captured fingerprint image being authenticated.

* * * * *